United States Patent
Wisnudel et al.

(10) Patent No.: US 7,218,589 B2
(45) Date of Patent: May 15, 2007

(54) AUTHENTICABLE OPTICAL DISC, SYSTEM FOR AUTHENTICATING AN OPTICAL DISC AND METHOD THEREOF

(75) Inventors: Marc Brian Wisnudel, Clifton Park, NY (US); Radislav Alexandrovich Potyrailo, Niskayuna, NY (US); William Guy Morris, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 651 days.

(21) Appl. No.: 10/723,682

(22) Filed: Nov. 24, 2003

(65) Prior Publication Data
US 2005/0111342 A1 May 26, 2005

(51) Int. Cl.
*G11B 7/00* (2006.01)

(52) U.S. Cl. .................................... 369/53.21

(58) Field of Classification Search ............. 369/53.21, 369/53.22, 59.21, 53.2, 47.1, 47.27, 47.28, 369/44.26
See application file for complete search history.

(56) References Cited

U.S. PATENT DOCUMENTS

| | | |
|---|---|---|
| 4,774,315 A | 9/1988 | Miller |
| 5,028,690 A | 7/1991 | Gallucci |
| 5,043,203 A | 8/1991 | Fyvie et al. |
| 5,356,668 A | 10/1994 | Paton et al. |
| 5,644,017 A | 7/1997 | Drumright et al. |
| 5,668,202 A | 9/1997 | Hirata et al. |

(Continued)

FOREIGN PATENT DOCUMENTS

EP 1 189 062 3/2002

(Continued)

OTHER PUBLICATIONS

PCT International Search Report dated Apr. 22, 2005.

(Continued)

*Primary Examiner*—Nabil Hindi
(74) *Attorney, Agent, or Firm*—Andrew J. Caruso; William E. Powell, III

(57) ABSTRACT

An authenticable optical disc and a system and method for authenticating the optical disc are provided. The optical disc comprising a reflective layer; an optically transparent substrate disposed between the reflective layer and a light incident surface of the optical disc; a data layer disposed between the substrate and the reflective layer, the data layer including a predetermined signature; and at least one measurable feature, wherein the at least one feature is compared to the predetermined signature for authenticating the optical disc. The method comprises the steps of preparing an optical disc with at least one optical feature; measuring intensity of transmitted light from the at least one optical feature; and comparing the measured intensity to a predetermined signature, wherein if the measured intensity and predetermined signature matches, access to the optical disc is granted.

27 Claims, 4 Drawing Sheets

U.S. PATENT DOCUMENTS

| | | | |
|---|---|---|---|
| 5,706,266 A | | 1/1998 | Brownstein et al. |
| 5,815,484 A | | 9/1998 | Smith et al. |
| 5,875,170 A | * | 2/1999 | Tompkin et al. ......... 369/275.1 |
| 5,892,577 A | | 4/1999 | Gordon |
| 6,099,930 A | | 8/2000 | Cyr et al. |
| 6,327,031 B1 | | 12/2001 | Gordon |
| 6,342,349 B1 | | 1/2002 | Virtanen |
| 6,500,547 B1 | | 12/2002 | Potyrailo et al. |
| 6,514,617 B1 | | 2/2003 | Hubbard et al. |
| 6,786,954 B1 | * | 9/2004 | Lee et al. ................ 106/31.13 |
| 2002/0173040 A1 | | 11/2002 | Potyrailo et al. |
| 2003/0076775 A1 | | 4/2003 | Sato et al. |

FOREIGN PATENT DOCUMENTS

| | | | | |
|---|---|---|---|---|
| EP | 1217356 | * | 6/2002 | ............. 369/53.21 |
| JP | 2000076659 | | 3/2000 | |
| WO | 98/12559 | | 3/1998 | |
| WO | 99/35499 | | 7/1999 | |
| WO | WO 00/14734 | | 3/2000 | |
| WO | 00/21086 | | 4/2000 | |
| WO | 03/087888 | | 10/2003 | |

OTHER PUBLICATIONS

USCD Scientists Develop Novel Way to Screen Molecules Using Conventional CDs and Compact Disk Players, Science and Engineering UCSD Press Release, Aug. 20, 2003.

La Clair, et al., "Molecular Screening on a compact disc," Org. Biomol. Chem. 2003, 1 (Advance Article) (Abstract).

La Clair, et al., "Molecular Screening on a compact disc," Org. Biomol. Chem. 2003, 1, (Advance Article) (Paper).

Duffy, et al. "Microfabricated Centrifugal Microfluidic Systems: Characterization and Multiple Enzymatic Assays," Anal. Chem. 71:4669-4678 (1999).

GE U.S. Appl. No. 10/280,934, filed Oct. 25, 2002, "System And Method For Digital Storage Media Copy Protection,", pp. 1-50 (Figures 1-14).

La Clair, et al., "Molecular Screening on a compact disc," Org. Biomol. Chem. 2003, 1:3244-3249.

* cited by examiner

AUTHENTICABLE OPTICAL DISC, SYSTEM FOR AUTHENTICATING AN OPTICAL DISC AND METHOD THEREOF

BACKGROUND OF THE INVENTION

This disclosure relates generally to optical data systems, and more particularly, to an authenticable optical disc and systems for authenticating optical discs and methods thereof.

Billions of dollars are lost every year due to copyright infringement. A common loss of revenue is through the unauthorized replication & distribution of optical media, e.g., compact discs (CDs) and digital video discs (DVDs). There have been many attempts to prevent copying of discs and limiting access to data on unauthorized copies of discs. Such methods include encoding patterns, applying coatings, or "burning" regions on the disc that result in errors in the datastream. Software encoded in the media "looks" for these errors and, if they are present, the rest of the software is allowed to execute. Unfortunately, these methods are easily defeated. Software programs such as "CDclone" or "Blindwrite/Blindcopy" actually look for these copy-protection regions in the datastream and re-create them so that the copy is similar to the original.

In Cyr et al., U.S. Pat. No. 6,099,930, tagging materials are placed in materials such as digital compact discs as a means to determine the authenticity of the compact discs. A near-infrared fluorophore is incorporated into the compact disc via coating, admixing, blending, or copolymerization. Fluorescence is detectable when the fluorophore is exposed to electromagnetic radiation having a wavelength ranging from 670 nanometers to 1100 nanometers. An illumination source provides excitation light that impinges upon or penetrates the compact disc. Once excited, the near infrared fluorophore emits light at a longer wavelength than the respective wavelength of the excitation light. At least some of the fluorescent light and a portion of the excitation light are reflected by the compact disc and is directed towards a camera. The camera then produces an electric signal suitable to generate an image directly on a viewing means. The compact disc is then authenticated by a user viewing the image or by an image recognition device/software process.

BRIEF DESCRIPTION OF THE INVENTION

An authenticable optical disc and systems for authenticating optical discs and methods thereof are provided. An optical disc, e.g., optical media, is tagged with complex features that are not easily duplicated by copy programs. Furthermore, software encoded in the media actually looks for these features on the disc and compares the acquired information from an analog-digital acquisition card or another type of a data-acquisition device such as a microprocessor chip to a predetermined signature programmed into the software code or acquired from the disc. Upon successful recognition of the signature, the software on the optical disc is allowed to execute.

According to an aspect of the present disclosure, an optical disc is provided comprising a reflective layer; an optically transparent substrate, wherein the substrate is disposed between the reflective layer and a light incident surface of the optical disc; a data layer disposed between the substrate and the reflective layer, the data layer including a predetermined signature; and at least one optically measurable feature, wherein the at least one feature is compared to the predetermined signature for authenticating the optical disc.

According to another embodiment, a system for authenticating an optical disc is provided. The system comprises a disc drive for supporting and rotating an optical disc including at least one feature; a light source for directing light onto the at least one feature; at least one optical pickup for detecting light transmitted from the at least one feature, the detected light being indicative of a predetermined signature; an analog-to-digital converter for quantifying an intensity of the detected light; and a processor for determining if the intensity of light matches the predetermined signature, wherein if the intensity matches the predetermined signature, the optical disc is authenticated.

In a further embodiment, a method of authenticating an optical disc is provided, the method comprising the steps of preparing an optical disc with at least one optical feature; measuring intensity of detected light from the at least one optical feature; and comparing the measured intensity to a predetermined signature, wherein if the measured intensity and predetermined signature matches, the optical disc is allowed to be read.

BRIEF DESCRIPTION OF THE DRAWINGS

The above and other aspects, features, and advantages of the present invention will become more apparent in light of the following detailed description when taken in conjunction with the accompanying drawings in which.

DETAILED DESCRIPTION OF THE INVENTION

Preferred embodiments of the present invention will be described herein below with reference to the accompanying drawings. In the following description, well-known functions or constructions are not described in detail to avoid obscuring the invention in unnecessary detail.

An authenticable optical disc and a system and method for authenticating the optical disc are provided. Features are incorporated into the optical disc, e.g. dye coatings, dyes in a polycarbonate substrate, etc., and the optical disc is placed into an optical drive capable of acquiring analog light intensity values. The analog output from the drive is captured and converted to digital form. Software running on the system controls the acquisition of the analog signal and the analysis of the digital form of the analog signal. The data from the signal(s) are compared to a predetermined signature that is encoded in the datastream on the optical disc. If the acquired data matches the signature, then the disc is deemed authentic and the rest of the software on the disc is allowed to be read and executed. An unauthorized copy of the disc, not containing the identifying features will not have the appropriate signature when it is read by a computer. In this case, the software will not be allowed to execute from the optical disc.

Figure 1:
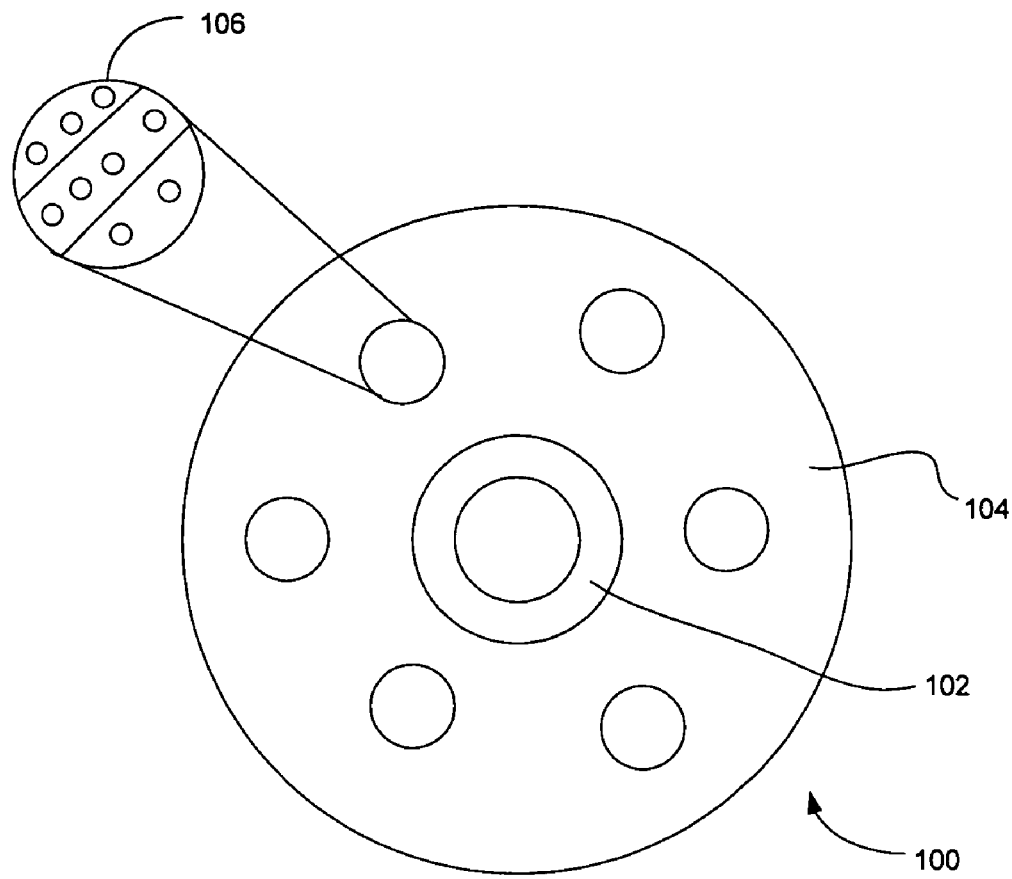
FIG. 1 is a top plan view of a disc including a plurality of features.

Referring to FIG. 1, an exemplary optical disc 100 is shown. The disc 100 generally is constructed from an injection-molded piece of polycarbonate plastic which is impressed with microscopic bumps arranged as a single, continuous spiral track of data as is known in the art. The bumps will form a series of pits and lands, i.e., non-bump areas, which will be encoded as digital data, i.e., 0's and 1's when the disc is read in the drive. A reflective metallic layer, typically aluminum, is sputtered onto the plastic covering the bumps, and then, in the case of compact discs (CDs) a thin acrylic layer is coated over the aluminum to protect it. In the case of DVDs, the metalized substrate is bonded to another polycarbonate substrate using a UV-curable adhesive.

Figure 2:
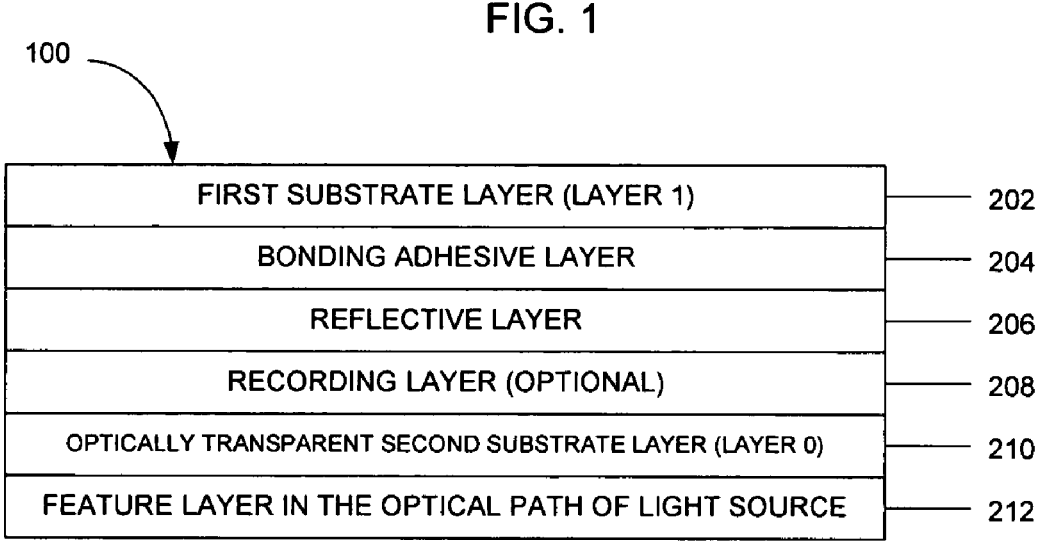
FIG. 2 is a cross sectional view of an optical disc containing a feature.

FIG. 2 is a cross sectional view of the optical disc 100 containing at least one feature. In various embodiments, the optical disc 100 includes a plurality of layers. These layers include, but are not limited to, a first substrate layer 202 (substrate layer 1) comprising a thermoplastic, such as a polycarbonate or the like; a second substrate layer 210 (substrate layer 0) also comprising a thermoplastic, such as a polycarbonate or the like; a reflective layer 206 comprising a metal, such as Al, Ag or Au, or the like; optionally, either a data layer comprising regions of pits and lands molded into the second substrate and/or a recording layer 208 comprising a recordable material, such as phthalocyanine or the like, or a re-writable material, such as an magneto-optic (MO) material, a phase-change material, a chalcogenide or the like; a bonding adhesive layer 204; and a feature layer 212 covering regions of the second substrate (layer 0). Optionally, the feature layer may cover regions of the reflective layer 206 or recording layer 208. Optionally, the features may be dispersed within regions of the second substrate layer 210. Optionally, the optical disk may contain more than one data layer, as in DVD9, DVD10, and DVD18 formats. Optionally, the optical disk may contain one polycarbonate substrate as in CD or two substrates as in DVD. Each of the layers is described in greater detail herein below.

It should be noted that, although preferred layer combinations are illustrated and described herein, other layer combinations will be readily apparent to those of ordinary skill in the art and are contemplated by the present invention.

The plastic employed for both the first substrate 202 and second substrate 210 should be capable of withstanding subsequent processing parameters (e.g., application of subsequent layers) such as sputtering temperatures of about room temperature (about 25° C.) up to about 150° C., and subsequent storage conditions (e.g., in a hot car having temperatures up to about 70° C.). That is, it is desirable for the plastic to have sufficient thermal and mechanical stability to prevent deformation during the various layer deposition steps as well as during storage by the end-user. Possible plastics include thermoplastics with glass transition temperatures of about 100° C. or greater, with about 125° C. or greater preferred, about 140° C. or greater more preferred, and about 200° C. or greater even more preferred (e.g., polyetherimides, polyetheretherketones, polysulfones, polyethersulfones, polyetherethersulfones, polyphenylene ethers, polyimides, polycarbonates, etc.); with materials having glass transition temperatures greater than about 250° C. more preferred, such as polyetherimide in which sulfonedianiline or oxydianiline has been substituted for m-phenylenediamine, among others, as well as polyimides, combinations comprising at least one of the foregoing plastics, and others. Generally, polycarbonates are employed.

Some possible examples of first substrate and second substrate materials include, but are not limited to, amorphous, crystalline, and semi-crystalline thermoplastic materials such as: polyvinyl chloride, polyolefins (including, but not limited to, linear and cyclic polyolefins and including polyethylene, chlorinated polyethylene, polypropylene, and the like), polyesters (including, but not limited to, polyethylene terephthalate, polybutylene terephthalate, polycyclohexylmethylene terephthalate, and the like), polyamides, polysulfones (including, but not limited to, hydrogenated polysulfones, and the like), polyimides, polyether imides, polyether sulfones, polyphenylene sulfides, polyether ketones, polyether ether ketones, ABS resins, polystyrenes (including, but not limited to, hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including, but not limited to, polymethylmethacrylate (PMMA), methyl methacrylate-polyimide copolymers, and the like), polyacrylonitrile, polyacetals, polycarbonates, polyphenylene ethers (including, but not limited to, those derived from 2,6-dimethylphenol and copolymers with 2,3,6-trimethylphenol, and the like), ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, and tetrafluoroethylenes (e.g., Teflons).

The optical disc 100, e.g., data storage media, can be produced by first forming the substrate material using a conventional reaction vessel capable of adequately mixing various precursors, such as a single or twin-screw extruder, kneader, blender, or the like. The extruder should be maintained at a sufficiently high temperature to melt the substrate material precursors without causing decomposition thereof. For polycarbonate, for example, temperatures in a range between about 220° C. and about 360° C. can be used, and preferably in a range between about 260° C. and about 320° C. Similarly, the residence time in the extruder should be controlled to minimize decomposition. Residence times of up to about 2 minutes (min) or more can be employed, with up to about 1.5 min preferred, and up to about 1 min especially preferred. Prior to extrusion into the desired form (typically pellets, sheet, web, or the like), the mixture can optionally be filtered, such as by melt filtering, the use of a screen pack, or combinations thereof, or the like, to remove undesirable contaminants or decomposition products.

Once the plastic composition has been produced, it can be formed into the substrate using various molding techniques, processing techniques, or combinations thereof. Possible techniques include injection molding, film casting, extrusion, press molding, blow molding, stamping, and the like. Once the substrate has been produced, additional processing, such as electroplating, coating techniques (e.g., spin coating, spray coating, vapor deposition, screen printing, inkjet printing, laser processing (marking or ablation), painting, dipping, and the like), lamination, sputtering, and the like, as well as combinations comprising at least one of the foregoing processing techniques, may be employed to dispose desired layers on the substrate or to modify the substrate surface. Typically, the substrate has a thickness of up to about 600 microns.

In recordable media, the data are encoded by laser, which illuminates an active data layer that undergoes a phase change, thus producing a series of highly-reflecting or non-reflective regions making up the data stream. In these formats, a laser beam first travels through an optically transparent substrate before reaching the data layer. At the data layer, the beam is either reflected or not, in accordance with the encoded data. The laser light then travels back through the optically transparent substrate and into an optical detector system where the data are interpreted. Thus, the data layer is disposed between the optically transparent substrate 210 and the reflective layer 206. The data layer(s) for an optical application typically is pits, grooves, or combinations thereof on the substrate layer. Preferably, the data layer is embedded in the substrate surface. Typically, an injection molding-compression technique produces the substrate where a mold is filled with a molten polymer as defined herein. The mold may contain a preform, insert, etc. The polymer system is cooled and, while still in at least partially molten state, compressed to imprint the desired surface features, for example, pits and grooves, arranged in spiral concentric or other orientation onto the desired portions of the substrate, i.e., one or both sides in the desired areas.

Possible data recording layers 208 for magnetic or magneto-optic applications may comprise any material capable of storing retrievable data and examples include, but are not limited to, oxides (such as silicone oxide), rare earth elements—transition metal alloys, nickel, cobalt, chromium, tantalum, platinum, terbium, gadolinium, iron, boron, others, and alloys and combinations comprising at least one of the foregoing, organic dyes (e.g., cyanine or phthalocyanine type dyes), and inorganic phase change compounds (e.g., TeSeSn, InAgSb, and the like).

Optionally, protective layer(s), which protect against dust, oils, and other contaminants, may be provided on any of the layers. The protective layer can have a thickness of greater than about 100 microns (μm) to less than about 10 Angstroms (Å), with a thickness of about 300 Å or less preferred in some embodiments, and a thickness of about 100 Å or less especially preferred. The thickness of the protective layer(s) is usually determined, at least in part, by the type of read/write mechanism employed, e.g., magnetic, optic, or magneto-optic. Possible protective layers include anti-corrosive materials such as gold, silver, nitrides (e.g., silicon nitrides and aluminum nitrides, among others), carbides (e.g., silicon carbide and others), oxides (e.g., silicon dioxide and others), polymeric materials (e.g., polyacrylates or polycarbonates), carbon film (diamond, diamond-like carbon, and the like), among others, and combinations comprising at least one of the foregoing materials.

Optionally, dielectric layer(s), which are typically disposed on one or both sides of the data layer and are often employed as heat controllers, can typically have a thickness of up to or exceeding about 1,000 Å and as low as about 200 Å or less. Possible dielectric layers include nitrides (e.g., silicon nitride, aluminum nitride, and others); oxides (e.g., aluminum oxide); sulfides (e.g. zinc sulfide); carbides (e.g., silicon carbide); and combinations comprising at least one of the foregoing materials, among other materials compatible within the environment and preferably not reactive with the surrounding layers.

The reflective layer(s) 206 should have a sufficient thickness to reflect a sufficient amount of energy (e.g., light) to enable data retrieval. Typically the reflective layer(s) can have a thickness of up to about 700 Å or so, with a thickness in a range between about 300 Å and about 600 Å generally preferred. Possible reflective layers include any material capable of reflecting the particular energy field, including metals (e.g., aluminum, silver, gold, silicon, titanium, and alloys and mixtures comprising at least one of the foregoing metals, and others).

The adhesive layer 204 can adhere any combination of the above-mentioned layers. The adhesive layer can comprise any material that does not substantially interfere with the transfer of light through the media from and to the data retrieval device (e.g., that is substantially transparent at the wavelength of light utilized by the device, and/or which allows a reflectivity from the media of about 50% or greater, with a percent reflectivity of about 65% or greater preferred and a percent reflectivity of about 75% or greater more preferred). Possible adhesive materials include UV materials such as acrylates (e.g., cross-linked acrylates, and the like), silicon hardcoats, and the like, as well as reaction products and combinations comprising at least one of the foregoing materials. Other examples of UV materials are described in U.S. Pat. Nos. 4,179,548 and 4,491,508. Some useful monoacrylate monomers include butyl acrylate, hexyl acrylate, dodecyl acrylate and the like. Some useful polyfunctional acrylate monomers include, for example, diacrylates, triacrylates, tetraacrylates, and combinations thereof.

Although the adhesive layer may contain only one of said polyfunctional acrylate monomers, or a mixture comprising at least one of the polyfunctional acrylate monomers (and the UV light reaction product thereof), preferred coating compositions contain a mixture of two polyfunctional monomers (and the UV light reaction product thereof), preferably a diacrylate and a triacrylate (and the UV light reaction product thereof), with mono-acrylate monomers used in particular instances. Optionally, the adhesive coating can comprise nonacrylic UV curable aliphatically unsaturated organic monomers in amounts up to about 50 weight % of the uncured adhesive coating that includes, for example, such materials as N-vinyl pyrrolidone, styrene, and the like, and reaction products and combinations comprising at least one of the foregoing materials.

Referring back to FIG. 1, the disc 100 includes a first digital data section 102, a second digital data section 104 including a plurality of features 106. Since data is recorded on the spiral track from the inside of the disc to the outside, the first digital data section 102 is located on the inner most part of the disc 100 and includes a signature of at least one feature of the optical disc 100. The signature will include information that is expected to be read from the feature 106. The second digital data section 104 may include various types of data including application programs, audio files, video files, databases, etc.

In one embodiment, a feature layer located adjacent to the transparent (read-through) polycarbonate substrate contains authenticatable features. Optionally, the authenticatable features can be in or on the transparent polycarbonate substrate. Optionally, the features may be in or on the data layer. The features may be regions or spots of different reflectivity, refractive index, luminescence, absorbance, scatter, or polarization or any other known optical state. In general, the features are the regions that modulate the amount of light directed to the photodetector using any known means. The features may be comprised of materials which change optical state upon interaction with light. The materials may be permanent dyes, pigments, or any other additives known in the art, or may change optical properties temporarily or be transient in nature. In the embodiment in which the features are regions of different reflectivity, the reflectivity is less than 45%, preferably less than 30% and even more preferably less than 15%; in order to be measurable, the reflectivity of the features is sufficiently different than the reflectivity of the regions without the features.

The size of the features is large enough so that the features can be detected and analyzed by the optical drive system described below. Yet, the features can be small enough to induce difficulties in the naked-eye detection of features. The feature layer may cover the entire disc or may cover only regions of the disc. Preferably, the features are spots that have radial size of greater than 0.25 micrometers and less than 10 millimeters, more preferably of radial size of greater than 0.5 micrometers and less than 8 millimeters, and most preferable of radial size of greater than 0.75 micrometers and less than 5 millimeters.

The features may be applied to the surface of finished discs or incorporated into any of the production steps during the production of the discs. The features can be produced using any processing methods known in the art, for example electroplating, coating techniques (e.g., spin coating, spray coating, vapor deposition, screen printing, inkjet printing, laser processing (ablation), painting, dipping, and the like), lamination, sputtering, and the like, as well as their combinations.

In another embodiment, the optical disc 100 will include authenticatable features at different locations on a disk (e.g., 3 logical block addresses A,B,C). For example, tags (regions of different reflectivity) may be located in different locations on the optical disc. Tagging materials and methods are disclosed in commonly assigned U.S. Pat. No. 6,514,617 issued to Hubbard et al., the contents of which are hereby incorporated by reference.

For ease of manufacture, the tag, e.g., feature, may be present relative to the predetermined signature, e.g., within a few mm in the tangential direction from a specific logical block address. Thus, A+−x sectors would be read in order to search for the tag near address A. Optionally, instead of seeking specific addresses of the three features, the relative positions of the features is the predetermined signature.

Optionally, the reflectivity of the tag may be of various thresholds such that the amplitude of the analog signal is used as an identifying feature as well as the location of the tag. This would help thwart hackers from duplicating the authenticatable features by using a marker pen, for example, a hacker would need to know both location as well as absorbance of the antipiracy features.

In another embodiment, the authenticatable features are positioned in locations on the disc so as to not interfere with the process of reading data off of the disc. Correctable and non-correctable errors may result when the drive encounters and attempts to read regions of the data layer that may be blocked or partially corrupted by the authenticatable features. Preferably, the position and size of the features is such that the errors are correctable by drive's error correction code (ECC). This improves data fidelity as well as makes it more difficult for copy programs to detect the presence of the features. Even further, the authenticatable features could be partially hidden by the use of colored polycarbonate resin for the molding of the second substrate 210 of the optical disc.

An array of features is produced where each of the features modifies the reflectivity of the media at a certain level. The features are produced with a high precision and accuracy. In this way, such high precision and accuracy is unavailable using an non-optimized equipment. For example, features can be produced as a polymer coating spots that generate a certain type and amount of an edge. The edge is an increased thickness of the coating on the outer region of the coating. Such type and amount of an edge is produced by selection of deposition conditions that include amount of solids in the solution, type of solvent, deposition temperature, rate of solvent removal, and other parameters critical for the reproducible generation of an edge during coating formation. The reproducible generation of an edge during coating formation includes also generation of no measurable edge.

Figure 3:
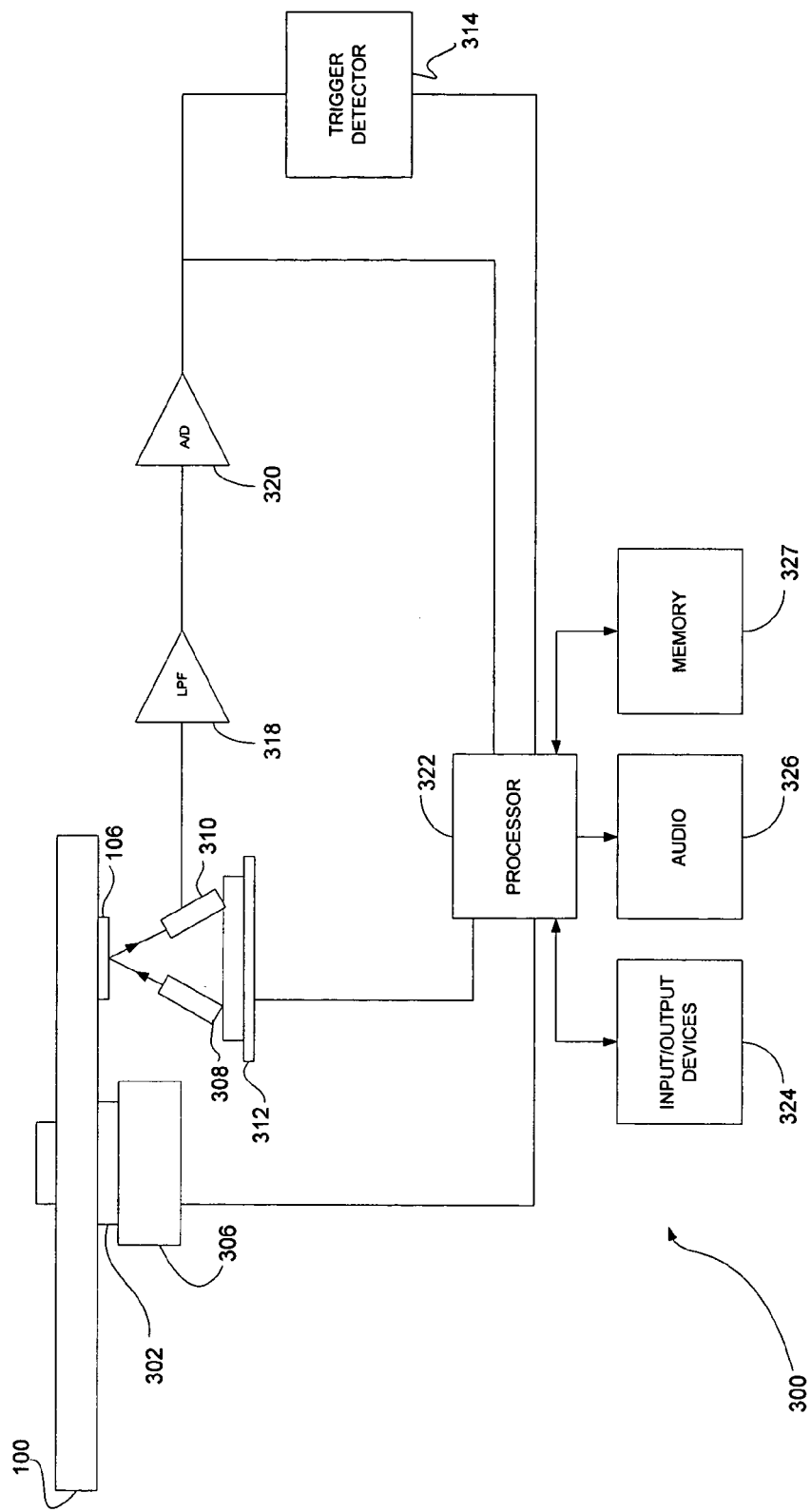
FIG. 3 is a block diagram of an exemplary system for authenticating an optical disc.

Referring to FIG. 3, a system is provided for authenticating an optical disc. The system 300 includes a disc drive 302 for supporting a disc 100 including a plurality of features 106. The disc drive 302 is coupled to a drive motor 306 for rotating the disc 100 when in operation. The optical disc drive further includes a light source 308, e.g., a laser, for directing light onto a readable surface of the disc and an optical pickup 310 for detecting light reflected from the disc. The light source 308 and optical pickup 310 are mounted on a tracking mechanism 312 to move the light source 308 and optical pickup 310 in an outward direction from a center of the disc while in a read operation.

As in a conventional optical disc drive, the system 300 includes a trigger detector 314 coupled to the optical pickup 310 to determine when a change in level of light has occurred, e.g., when light is reflected from a pit or a land, to generate a 0 or 1 data stream. Unlike in conventional drives, drive 300 includes an analog-to-digital converter A/D 320 coupled to the optical pickup 310 for measuring intensity values of the reflected light as an RF signal. Outputs of the trigger detector 314 and the analog-to-digital converter 320 are sent to processor 322 for rendering measured intensity values on a display 324 or via an audio means 326. Detector intensity is defined as the RF signal generated by the intensity of reflected light captured by the optical pickup 310.

The data contained in the raw RF signal (about 10 MHz) shows up as noise when sampled at 200 kHz in the analog-to-digital converter 320. Because the processor 322 is interested only in the average levels in a baseline signal and peaks of the measured signal, this noise can be further reduced by filtering via filter 318 or by averaging multiple waveforms.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM) and a read only memory (ROM) 327 and input/output (I/O) interface(s) such as keyboard, cursor control device (e.g., a mouse) and display device. An internal system clock is also provided for performing temporal analysis as well as automating drive movements at specific times. The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional storage device and printing device.

For example, the analog signal, e.g., measured intensity of light, is coupled to an input of an analog-to-digital conversion circuit such as a National Instruments DAQCard model AI-16XE-50, and the digital data is read into a personal computer. Alternatively, the analog signal may be acquired from an analog-to-digital circuit inside a modified optical drive or externally from, for example, a digital oscilloscope.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 4:
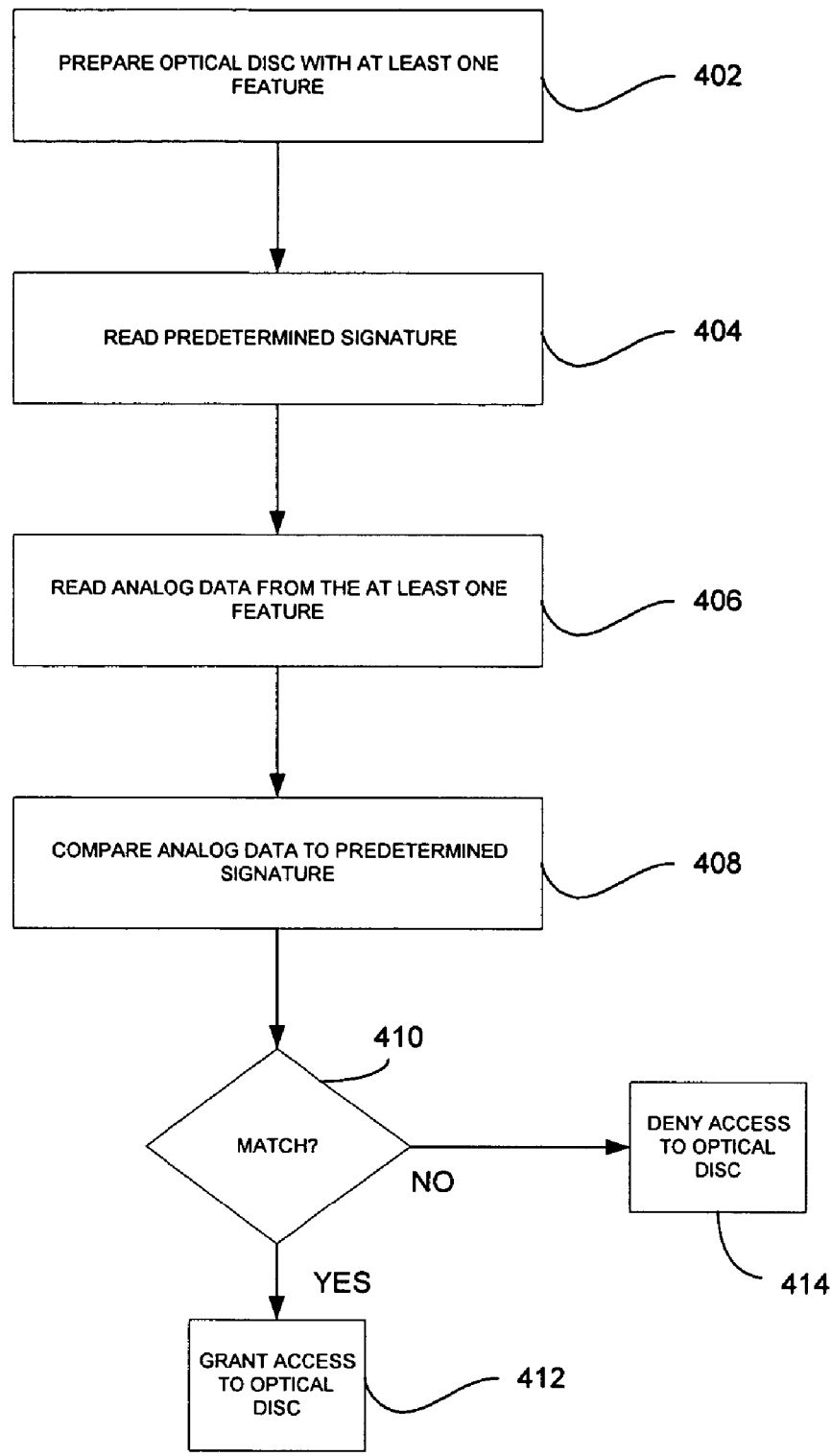
FIG. 4 is a flowchart illustrating a method for authenticating an optical disc.

Referring to FIG. 4, a method from authenticating an optical disc is provided. Initially in step 402, an optical disc 100 is prepared with at least feature 106 incorporated in or disposed upon the disc. The optical disc is placed in a system capable of reading digital and analog data, as described above in relation to FIG. 3. The first digital data section 102 of the optical disc 100 is then accessed to read a predetermined signature of the at least one feature 106 (step 404). Alternatively, the predetermined signature may be read from a memory of the system. The first digital data section may include information on a location of the feature and an expected value to be read from the feature of a specific location.

Next, the system will acquire analog data, e.g., intensity of light transmitted, from the at least one feature (step 406). The acquired analog data will be compared to predetermined signature to determine if the optical disc is authentic (step 408). If the acquired analog data matches the predetermined signature (step 410), access to the second digital data section 104 of the optical disc 100 will be granted (step 412). Otherwise, if the acquired analog data does not match the predetermined signature, access to the second digital data section 104 of the optical disc 100 will be denied.

Figure 5:
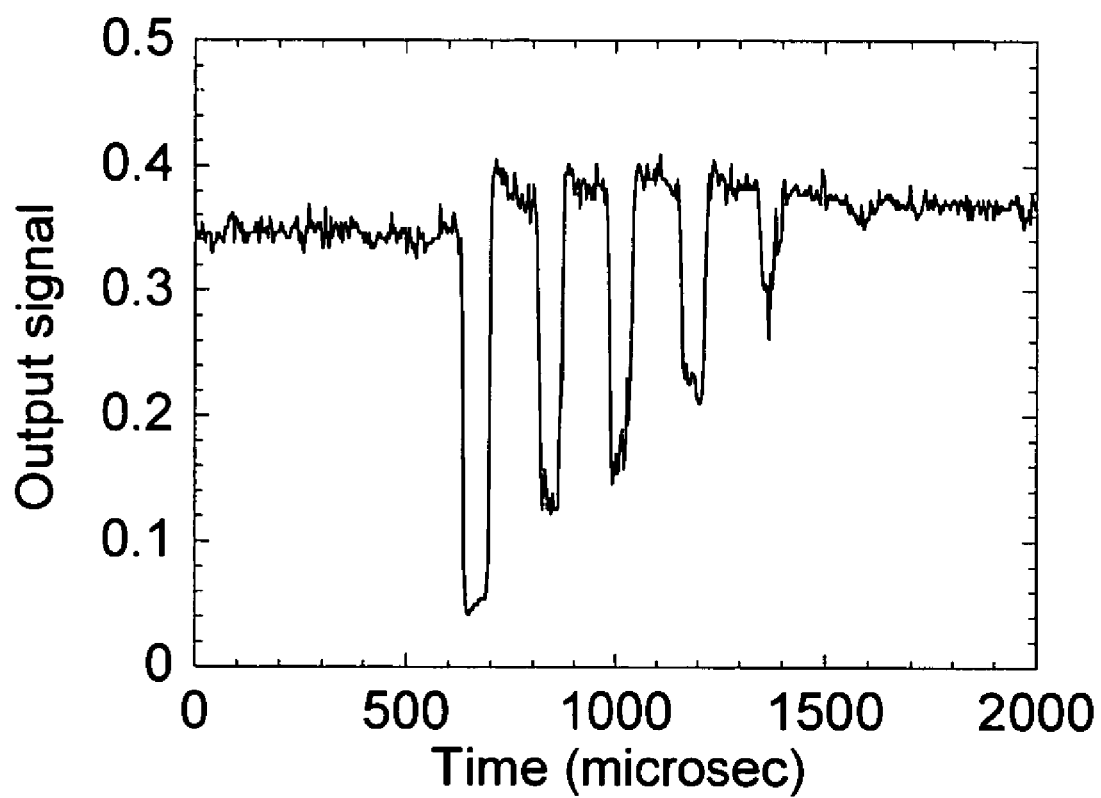
FIG. 5 is a graph illustrating quantitative signal detection of multiple authentication regions on a disc, where time in microseconds indicates the relative distance on the optical media.

For demonstration of quantitative authenticatable detection, regions of different grayscale were produced on a surface of an optical disc. These regions were designed to be insensitive to environmental conditions and to serve as reference regions. Measurements were performed across different gray-scale regions simultaneously. For the measurements, a CD/DVD combo drive (Pioneer Model 115) was used. Data acquisition was performed using a single channel of a digital oscilloscope (Digital Phosphor Oscilloscope, Tektronix Model TDS 5054) with the sampling rate of less than 50 MHz and with the averaging of 100 waveforms. FIG. 5 shows typical collected waveforms from these multiple regions. These data demonstrate the capability of the optical drive to detect different grayscale regions. The intensity of detector signal is proportional to the grayscale. This graph illustrates the quantitative signal detection of multiple authentication regions on a disc where the ratio of intensities of different regions provide the information about the authenticity of the disk.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

The invention claimed is:

1. An optical disc comprising:
   a) a reflective layer;
   b) an optically transparent substrate, wherein the substrate is disposed between the reflective layer and a light incident surface of the optical disc;
   c) a data layer disposed between the substrate and the reflective layer, the data layer including a predetermined signature; and
   d) at least one measurable feature, wherein the at least one feature is quantitatively compared to the predetermined signature for authenticating the optical disc, and wherein the at least one feature creates a correctable error resulting in no loss in data fidelity when the data layer is read.

2. The optical disc of claim 1, wherein the at least one feature is disposed on the substrate.

3. The optical disc of claim 1, wherein the at least one feature is within the substrate.

4. The optical disc of claim 1, wherein the at least one feature is located on, under, or in the data layer.

5. The optical disc of claim 1, wherein the at least one feature transmits a predetermined level of light intensity when excited by a light source.

6. The optical disc of claim 5, wherein the predetermined signature includes an expected value of the predetermined light intensity of the at least one feature.

7. The optical disc of claim 5, wherein the at least one feature is location-specific.

8. The optical disc of claim 5, wherein the at least one feature is logical-block address specific.

9. The optical disc of claim 5, wherein the predetermined signature includes a relative position for the at least one feature.

10. The optical disc of claim 1, wherein the predetermined signature is plurality of features at specific locations.

11. The optical disc of claim 1, further comprising a plurality of features, each of the plurality of features having a different predetermined light intensity value at each location of the optical disc.

12. The optical disc of claim 1, wherein the predetermined signature includes an address of the optical disc for the at least one feature.

13. The optical disc of claim 5, wherein the at least one feature transmits a plurality of thresholds of light intensity when excited by a light source.

14. The optical disc of claim 1, wherein the at least one feature is formed of a substantially similar color of the substrate.

15. A system for authenticating an optical disc, the system comprising:
   a disc drive for supporting and rotating an optical disc including at least one feature;
   a light source for directing light onto the at least one feature;
   at least one optical pickup for detecting light transmitted from the at least one feature;
   an analog-to-digital converter for quantifying an intensity of the detected light; and
   a processor for determining if the intensity of light matches a predetermined signature, wherein if the intensity matches the predetermined signature, the optical disc is authenticated, and wherein the at least one feature creates a correctable error resulting in no loss in data fidelity when the data layer is read.

16. The system as in claim 15, further comprises a digital-to-analog converter for reading digital data from the optical disc, the digital data including the predetermined signature.

17. The system as in claim 15, further comprises a memory, wherein the processor reads the predetermined signature from the memory.

18. The system as in claim 15, further comprising a display for visually producing the at least one feature.

19. In a system including a disc drive for supporting and rotating an optical disc, a light source for directing light onto the optical disc, at least one optical pickup for detecting light transmitted from the optical disc, and an analog-to-digital converter for quantifying an intensity of the detected light, a method for authenticating the optical disc, the method comprising the steps of:

preparing an optical disc with at least one optical feature;

measuring intensity of transmitted light from the at least one optical feature; and comparing the measured intensity to a predetermined signature, wherein if the measured intensity and predetermined signature matches, the optical disc is allowed to be read, and wherein the at least one optical feature creates a correctable error resulting in no loss in data fidelity when the data layer is read.

20. A method of authenticating an optical disc, the method comprising the steps of:

preparing an optical disc with at least one optical feature;

measuring an intensity of transmitted light from the at least one optical feature;

comparing the measured intensity to a predetermined signature, wherein if the measured intensity and predetermined signature matches, the optical disc is allowed to be read, and wherein the predetermined signature includes information on a location of the at least one feature, further comprising the step of determining if the location of the at least one feature is an expected location determined from the predetermined signature.

21. The method as in claim 20, wherein the predetermined signature is read from the optical disc.

22. The method as in claim 20, wherein the predetermined signature is a result of the mathematical processing of at least one optical feature.

23. The method as in claim 20, wherein the predetermined signature is a result of the mathematical processing of the optical feature that includes analysis of different spatial regions of the optical feature.

24. The method as in claim 20, wherein authentication of an optical disc includes the process of comparing the precision of the measured signal from different spatial regions of at least one optical feature with the stored reference parameter.

25. The method as in claim 20, wherein the predetermined signature is read from a processor for performing the comparing step.

26. A method of authenticating an optical disc, the method comprising the steps of:

preparing an optical disc with at least two optical features;

measuring intensities of transmitted light from the at least two optical features;

comparing the measured intensities from at least two optical features to a predetermined signature, wherein if the predetermined signature matches, the optical disc is allowed to be read, and wherein at least one optical feature creates a correctable error resulting in no loss in data fidelity when the data layer is read.

27. The method as in claim 26, wherein the predetermined signature is a result of the mathematical processing of signatures of at least two optical features.

* * * * *